United States Patent
Twiss

(10) Patent No.: US 10,601,658 B2
(45) Date of Patent: Mar. 24, 2020

(54) MAINTENANCE OF CONSUMABLE PHYSICAL COMPONENTS OF A NETWORK

(71) Applicant: Cisco Technology, Inc., San Jose, CA (US)

(72) Inventor: Robert Gregory Twiss, Chapel Hill, NC (US)

(73) Assignee: Cisco Technology, Inc., San Jose, CA (US)

( * ) Notice: Subject to any disclaimer, the term of this patent is extended or adjusted under 35 U.S.C. 154(b) by 283 days.

(21) Appl. No.: 14/681,651

(22) Filed: Apr. 8, 2015

(65) Prior Publication Data
US 2016/0301558 A1 Oct. 13, 2016

(51) Int. Cl.
| H04L 12/24 | (2006.01) |
| G06Q 10/00 | (2012.01) |
| H04L 12/26 | (2006.01) |
| G06Q 10/06 | (2012.01) |
| F24F 3/16 | (2006.01) |
| F24F 11/30 | (2018.01) |

(52) U.S. Cl.
CPC ..... *H04L 41/0853* (2013.01); *G06Q 10/0631* (2013.01); *G06Q 10/20* (2013.01); *H04L 41/145* (2013.01); *H04L 41/147* (2013.01); *H04L 43/0817* (2013.01); *F24F 3/1603* (2013.01); *F24F 11/30* (2018.01)

(58) Field of Classification Search
CPC . B60C 11/243; B60C 23/0449; G01F 23/263; G01F 23/26; H04L 67/12
See application file for complete search history.

(56) References Cited

U.S. PATENT DOCUMENTS

| 2002/0189267 A1* | 12/2002 | Singh | A23G 9/00 62/126 |
| 2006/0124740 A1* | 6/2006 | Woodard | B60C 23/0449 235/449 |
| 2009/0169429 A1* | 7/2009 | Sprengers | A61B 5/14546 422/68.1 |
| 2011/0299042 A1* | 12/2011 | Nishihata | B01D 46/0009 353/52 |

(Continued)

*Primary Examiner* — Barbara B Anyan
(74) *Attorney, Agent, or Firm* — Behmke Innovation Group LLC; James Behmke; Stephen D. LeBarron

(57) ABSTRACT

A system of maintaining consumable physical components of networking equipment includes a physical network operations controller, having a controller and an interconnected memory device, which is configured to communicate with at least one notification device and consumable physical components for networking equipment. The controller is configured to: obtain and store current operating status data for the plurality of consumable physical components; generate historical operating status data, heuristic maintenance model data and maintenance schedule data for the plurality of consumable physical components; determine that at least one maintenance event trigger criteria is met by at least one of the consumable physical components; generate a maintenance event notification and transmit the maintenance event notification to the notification device; and transmit to the consumable physical components maintenance action data indicating at least one of the maintenance actions to be performed based on the maintenance event trigger criteria being met.

20 Claims, 14 Drawing Sheets

(56) References Cited

U.S. PATENT DOCUMENTS

| | | | | |
|---|---|---|---|---|
| 2012/0138677 A1* | 6/2012 | Ma | G07F 19/207 | 235/379 |
| 2012/0323375 A1* | 12/2012 | Dean-Hendricks | F24F 3/1603 | 700/276 |
| 2012/0323377 A1* | 12/2012 | Hoglund | F24F 11/30 | 700/277 |
| 2013/0288585 A1* | 10/2013 | Hoke | B60H 3/0616 | 454/75 |
| 2013/0319227 A1* | 12/2013 | Becze | B01D 53/263 | 95/25 |
| 2014/0115784 A1* | 5/2014 | Johannigman | A61G 7/015 | 5/600 |
| 2015/0027546 A1* | 1/2015 | Bondeson | B29B 13/022 | 137/1 |
| 2015/0158109 A1* | 6/2015 | Chantry | B23K 9/1056 | 219/121.44 |
| 2016/0016315 A1* | 1/2016 | Kuffner, Jr. | B25J 9/1676 | 700/255 |

\* cited by examiner

US 10,601,658 B2

MAINTENANCE OF CONSUMABLE PHYSICAL COMPONENTS OF A NETWORK

TECHNICAL FIELD

The present disclosure relates generally to maintaining networking equipment, and in particular, to maintaining consumable physical components of networking equipment.

BACKGROUND

The development of technologies supporting the Internet of Everything (IoE) framework is increasing connectivity between electronic devices and the scope of networks. In order to meet the growing demand on networks, the performance and capabilities of the underlying network components are also increasing. In some cases, the increase in performance and capabilities has led to increased power consumption and greater consumption of physical components of a network.

Many of the network devices rely on consumable physical components, such as fans and air filters, to maintain preferred operating conditions (e.g., preferred thermal operating conditions). In some cases, malfunctioning or reduced performance of one consumable physical component will result in another consumable physical component compensating in a manner that increases power consumption or, for example, have other unwanted effects such as increased acoustical noise. For example, in order to maintain an acceptable amount of cooling airflow over equipment, an associated fan may run at a higher speed to compensate for a partially blocked air filter. Maintaining consumable physical components can be challenging, especially for networks that include numerous components spread out over large areas, and in locations that are remote and/or thinly staffed (e.g., datacenters). Customer demand for lower device and maintenance costs also impacts maintenance strategies for the consumable physical components. Replacing or repairing a consumable physical component before it malfunctions or before the performance of an associated networking component has fallen below an acceptable level may result in unnecessary costs. On the scale of a large network, the operations costs associated with maintaining consumable physical components can rise to a burdensome level.

BRIEF DESCRIPTIONS OF THE DRAWINGS

For a better understanding of aspects of the various implementations described herein and to show more clearly how they may be carried into effect, reference is made, by way of example only, to the accompanying drawings.

Figure 1:
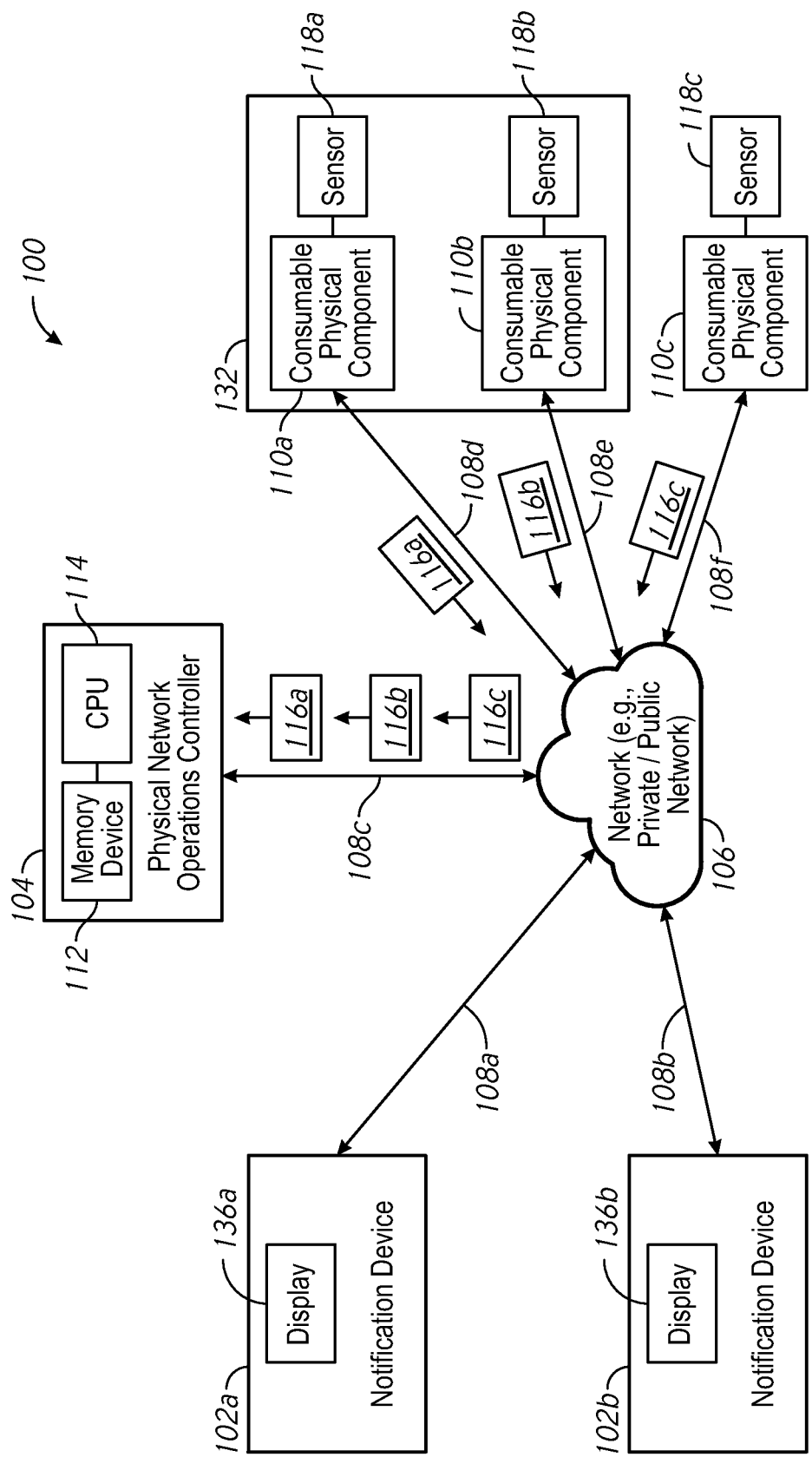
FIG. 1 is a block diagram of a system of maintaining consumable physical components of networking equipment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein in order to provide a thorough understanding of illustrative implementations shown in the drawings. However, the drawings merely show some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the implementations described herein.

Overview

Various implementations disclosed herein include apparatuses, systems, and methods enabling the maintenance and replenishment of consumable physical components associated with networking equipment. For example, in some implementations, a system of maintaining consumable physical components of networking equipment includes at least one notification device and a physical network operations controller configured to communication with the at least one notification device. The physical network operations controller is also configured to communication with a plurality of consumable physical components for networking equipment. The physical network operations controller includes a memory device and a controller interconnected with the memory device. The controller is configured to obtain current operating status data for the plurality of the consumable physical components for storage at the memory device and generate historical operating status data for the plurality of consumable physical components based on the stored current operating status data. The controller is further configured to generate heuristic maintenance model data for the plurality of consumable physical components based on at least one of the current operating status data and the historical operating status data. The heuristic maintenance model data defines maintenance actions and maintenance event trigger criteria for the plurality of consumable physical components. The controller generates maintenance schedule data for the plurality of the consumable physical components based on the heuristic maintenance model data. The controller determines that at least one of the maintenance event trigger criteria is met in respect of at least one of the plurality of consumable physical components. In response to determining that the at least one maintenance event trigger criteria is met, the controller generates a maintenance event notification, and transmits the maintenance event notification to the at least one notification device. The controller transmits to the at least one of the plurality of consumable physical components maintenance action data that indicates at least one of the maintenance actions to be performed based on the at least one of the maintenance event trigger criteria being met.

A multi-layered approach to maintaining the consumable physical components of networking equipment is described herein. In some implementations, a multi-layered approach includes a Manual Layer, an Automation Layer, an Enterprise Resource Planning (ERP) Layer and a Long-Term Planning (LTP) Layer.

In some implementations, the Manual Layer includes maintenance-related activities performed by maintenance personnel, such as visually inspecting, manually repairing and replacing the consumable physical components.

In some implementations, the Automation Layer includes maintenance-related activities performed by the consumable physical component. For example, in some implementations, the consumable physical component transmits data to a physical network operations controller indicating a current operating status of the consumable physical component. In some implementations, the current operating status includes information about the lifespan or failure of a subcomponent of the consumable physical component, the current power consumption of the consumable physical component and information about the current operating environment of the consumable physical component. In some implementations, the current operating status also identifies the consumable physical component and any other associated consumable physical components (e.g., associated by component type and/or proximity). In some implementations, the consumable physical component is configured to address certain maintenance issues. For example, the consumable physical component is an air filter that is configured to recognize when the filter media has reached a selected maintenance threshold of 80 percent occlusion and requires changing. The example air filter is also configured to replace the occluded filter media with fresh filter media. In some implementations, the consumable physical component is configured to send a notification to the physical network operations controller when a maintenance task is required to be performed on the consumable physical component.

In some implementations, the ERP Layer oversees the maintenance activities of the Manual Layer and the Automation Layer via the physical network operations controller. In some implementations, the ERP Layer generates maintenance tasks, maintenance schedules and the criteria for triggering a maintenance event, such as the failure of a consumable physical component. The ERP Layer also directs the consumable physical components and, in some implementations, the maintenance personnel to perform the maintenance activities. The ERP Layer obtains the data indicating a current operating status of the consumable physical component and uses the data to generate historical operating data of the consumable physical component. The current operating status may be obtained from the consumable physical component and/or an associated sensor (e.g., a thermal or airflow rate sensor). The ERP Layer also generates heuristic maintenance models based on the historical operating data and real-time operating data (e.g., current operating status data) of the consumable physical component. The heuristic maintenance models may aggregate some maintenance tasks or delay performance of a particular maintenance task in order to reduce operating costs and more efficiently use maintenance personnel or consumables resources. For example, the current operating status of a fan may indicate the fan's motor is broken. Instead of immediately triggering a maintenance event, the ERP Layer may poll thermal sensors and other fans in the vicinity of the broken fan (e.g., proximate to the broken fan) to determine if a selected thermal limit has been reached or if the current operating status of the other fans indicates an impending maintenance event. If the selected thermal limit has not been reached or there is no indication of an impending maintenance event, the ERP Layer may delay replacement of the broken fan.

In some implementations, the LTP Layer tracks the maintenance activities performed by the ERP Layer, the Automation Layer and the Manual Layer. In some implementations, the LTP Layer analyzes the maintenance activities of the ERP Layer, Automation Layer and the Manual Layer over a period of time to determine maintenance "hot-spots" among the consumable physical components of the networking equipment. For example, in some implementations, the LTP layer determines patterns in maintenance activities for groups of the consumable physical components. In some implementations, the LTP Layer tracks the costs associated with the performed maintenance activities and regenerates the heuristic maintenance models used by the ERP Layer to take into account those costs.

Consumable physical components include physical components that support the operation of networking equipment, such as servers, controllers, switches and routers, and are typically repaired or replaced over the lifetime of the networking equipment. Examples of consumable or items often most commonly replaced during service life of physical components include fans, air filters, and power supplies.

FIG. 1 depicts a system 100 configured to maintain consumable physical components of networking equipment in accordance with some implementations. The system 100 includes at least one notification device, such as the notification devices 102a and 102b, and a physical network operations controller 104. The physical network operations controller 104 is configured to communicate with the notification devices 102a and 102b over a network 106 via communication links 108a, 108b and 108c. The network 106 includes the Internet or any other suitable combination of wired and/or wireless communication networks. For example, in some implementations, the network 106 is a private network and, in other implementations, the network 106 is a public network. The communication links 108a, 108*b* and 108*c* include any combination of wired and/or wireless communication links suitable for the communication of at least data between the physical network operations controller 104 and the notification devices 102*a* and 102*b*. The physical network operations controller 104 is also configured to communicate with a plurality of consumable physical components of networking equipment, such as consumable physical components 110*a*, 110*b* and 110*c* (also referred to individually as the consumable physical component 110*a*, the consumable physical component 110*b* and the consumable physical component 110*c*, and as a group as the consumable physical components 110), over the network 106 and via communication links 108*c*, 108*d*, 108*e* and 108*f*. The communication links 108*c*, 108*d*, 108*e* and 108*f* include any combination of wired and/or wireless communication links suitable for the communication of at least data between the physical network operations controller 104 and the consumable physical components 110*a*, 110*b* and 110*c*. The communication between the physical network operations controller 104 and the consumable physical components 110 is bi-directional in that the physical network operations controller 104 is configured to transmit data to and to receive data from the consumable physical components 110, and vice-versa.

Figure 2:
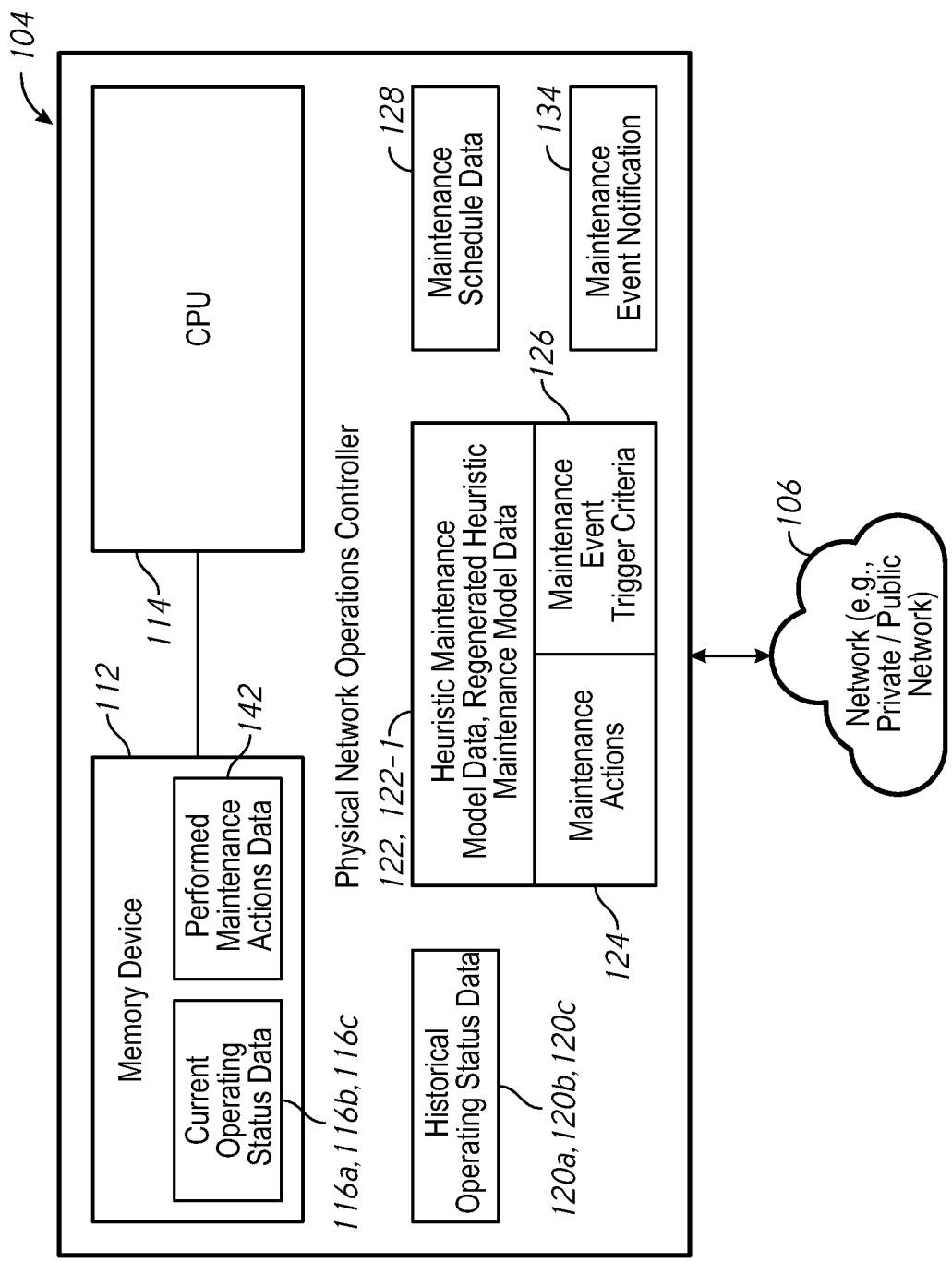
FIG. 2 is a block diagram of a physical network operations controller in accordance with some implementations.

The physical network operations controller 104 includes a memory device 112 and controller interconnected with the memory device 112, such as Central Processing Unit (CPU) 114. In FIGS. 1 and 2, the physical network operations controller 104 is depicted as a single computing device, such as a server. However, in some implementations, the physical network operations controller 104 includes multiple computing devices, some of which may be remote from other computing devices of the physical network operations controller 104.

The physical network operations controller 104 performs the maintenance-related activities of the ERP Layer and the LTP Layer. As shown in FIGS. 1 to 5, the CPU 114 is configured to obtain the current operating status data 116*a*, 116*b* and 116*c* of the consumable physical components 110. The current operating status data 116*a*, 116*b* and 116*c* includes data that indicates the operating or maintenance status of at least a subcomponent, such as a fan motor, of the consumable physical components 110. In some implementations, the current operating status data 116*a*, 116*b* and 116*c* includes at least one of the power consumption, the energy usage, a component identifier, a component type and a remaining expected lifespan for each one of the consumable physical components 110. In some implementations, the CPU 114 polls or requests the current operating status data 116*a*, 116*b* and 116*c* from one or more of the consumable physical components 110. In some implementations, one or more of the consumable physical components 110 transmits the current operating status data 116*a*, 116*b* and 116*c* to the physical network operations controller 104. In some implementations, the CPU 114 obtains the current operating status data 116*a*, 116*b* and 116*c* by a combination of polling the consumable physical components 110 and transmissions of the current operating status data 116*a*, 116*b* and 116*c* from one or more of the consumable physical components 110. In some implementations, the current operating status data 116*a*, 116*b* and 116*c* is obtained in real-time from the consumable physical components 110. The current operating status data 116*a*, 116*b* and 116*c* is stored in the memory device 112.

Tracking the operating status of the consumable physical components 110 over a period of time is helpful in determining maintenance schedules and maintenance "hot-spots" among the consumable physical components 110. Based on the stored current operating status data 116*a*, 116*b* and 116*c*, the CPU 114 is configured to generate historical operating status data 120*a*, 120*b* and 120*c* for the consumable physical components 110 (FIG. 2). The CPU 114 is also configured to generate heuristic maintenance models, in the form of heuristic maintenance model data 122, based on at least one of the current operating status data 116*a*, 116*b* and 116*c* and the historical operating status data 120*a*, 120*b* and 120*c* of the consumable physical components 110. The heuristic maintenance model data 122 takes into account various maintenance priorities, such as avoiding the failure of a threshold number of the consumable physical components 110 and staying below a desired power consumption limit for the consumable physical components 110, and patterns in the maintenance activities in respect of one or more of the consumable physical components 110. For example, in some implementations, the heuristic model data 122 takes into account how regularly the consumable physical component 110*a* has been repaired over a period of time.

In some implementations, there is at least one sensor associated with the consumable physical components 110. In the example system 100, the consumable physical components 110 are associated with sensors 118*a*, 118*b* and 118*c*, respectively. The sensors 118*a*, 118*b* and 118*c* are any combination of sensors suitable for detecting operating environmental conditions or performance indicators that are indicative of an operating status of at least one of the consumable physical components 110. For example, in some implementations, the consumable physical component 110*b* is a fan and the sensor 118*b* is a thermal sensor configured to determine the temperature of the air surrounding the consumable physical component 110*b*. If the consumable physical component 110*b* fan has failed (e.g., stopped running), then the sensor 118*b*, as a thermal sensor, will likely register a higher than normal air temperature reading. Since data from the sensors 118*a*, 118*b* and 118*c* can provide useful information in determining the current operating status of the consumable physical components 110, in some implementations, the CPU 114 is configured to obtain the current operating status data 116*a*, 116*b* and 116*c* from at least one of the sensors 118*a*, 118*b* and 118*c*. For example, in some implementations, the CPU 114 is configured to obtain the current operating status data 116*a*, 116*b* and 116*c* by polling at least one of the consumable physical components 110 and at least one of the sensors 118*a*, 118*b* and 118*c*.

The heuristic maintenance model data 122 defines maintenance actions 124 and maintenance trigger criteria 126 for the consumable physical components 110. The maintenance actions 124 include any action that is to be performed by any one of the consumable physical components 110, the maintenance personnel and the physical network operations controller 104 to repair, replace or otherwise maintain the consumable physical components 110. In order to streamline the maintenance activities performed, in some implementations, the heuristic maintenance model data 122 defines at least one relationship between the maintenance actions 124. For example, in some implementations, the consumable physical component 110*a* is an air filter and the consumable physical component 110*b* is a nearby fan (e.g., the consumable physical component 110*a* and the consumable physical component 110*b* are located in the same region of a data center 132). If the historical operating status data 120*a*, 120*b* indicates that when the consumable physical component 110*a* air filter becomes fully blocked the consumable physical component 110*b* fan usually consumes power close to a threshold power consumption limit, it may be proactive to relate the maintenance actions of replacing the filter media for the consumable physical component 110a air filter with inspecting the consumable physical component 110b fan in order to perform the maintenance actions together.

The maintenance event trigger criteria 126 include the operating conditions of one or more of the consumable physical components 110 that must be met in order to initiate maintenance actions in respect of one or more of the consumable physical components 110. For example, in some implementations, the maintenance event trigger criteria 126 includes at least one of an indication of an operational failure of at least one subcomponent of the consumable physical components 110, an indication that the expected lifespan of at least one subcomponent of the consumable physical components 110 has been reached, an indication that a selected thermal limit of at least one of the consumable physical components 110 has been reached, an indication that a performance level of the at least one of the consumable physical components 110 is below a selected threshold limit, and a scheduled maintenance event for at least one of the consumable physical components 110 is due.

The heuristic maintenance model data 122 is also used by the CPU 114 to generate maintenance schedule data 128 for the consumable physical components 110. For example, the frequency with which a particular subcomponent of the consumable physical component 110b fails will likely impact how often the consumable physical component 110b is inspected or a replacement subcomponent is to be ordered for the consumable physical component 110b. In some implementations, the maintenance event trigger criteria 126 takes into account relative weights between different maintenance priorities. For example, in some implementations, avoiding a power consumption limit by a particular one of the consumable physical components 110 is of greater importance than ensuring the expected lifespan of all of the consumable physical components 110 is reached before replacing or repairing any of the consumable physical components 110.

The CPU 114 is also configured to determine that at least one of the maintenance event trigger criteria 126 is met in respect of at least one of the consumable physical components 110. For example, in some implementations, the CPU 114 compares the obtained current operating status data 116a, 116b and 116c against the maintenance event trigger criteria 126. In some other implementations, the CPU 114 transmits the maintenance event trigger criteria 126 to the consumable physical components 110 (FIG. 3) and each one of the consumable physical components 110 determines whether the maintenance event trigger criteria 126 is met. For example, the consumable physical component 110c compares the maintenance event trigger criteria 126 to the current operating status data 116c and determines the maintenance event trigger criteria 126 is met (e.g., performance of a maintenance activity is required in respect of the consumable physical component 116c). The consumable physical component 110c transmits notification data 130 that indicates at least one of the maintenance event trigger criteria 126 is met in respect of the consumable physical component 116c. In some implementations, the notification data 130 includes an indication of which of the maintenance event trigger criteria 126 is met in respect of the consumable physical component 116c. The CPU 114 determines that at least one of the maintenance event trigger criteria 126 is met, particularly in respect of the consumable physical component 116c, by receiving the notification data 130.

Figure 4:
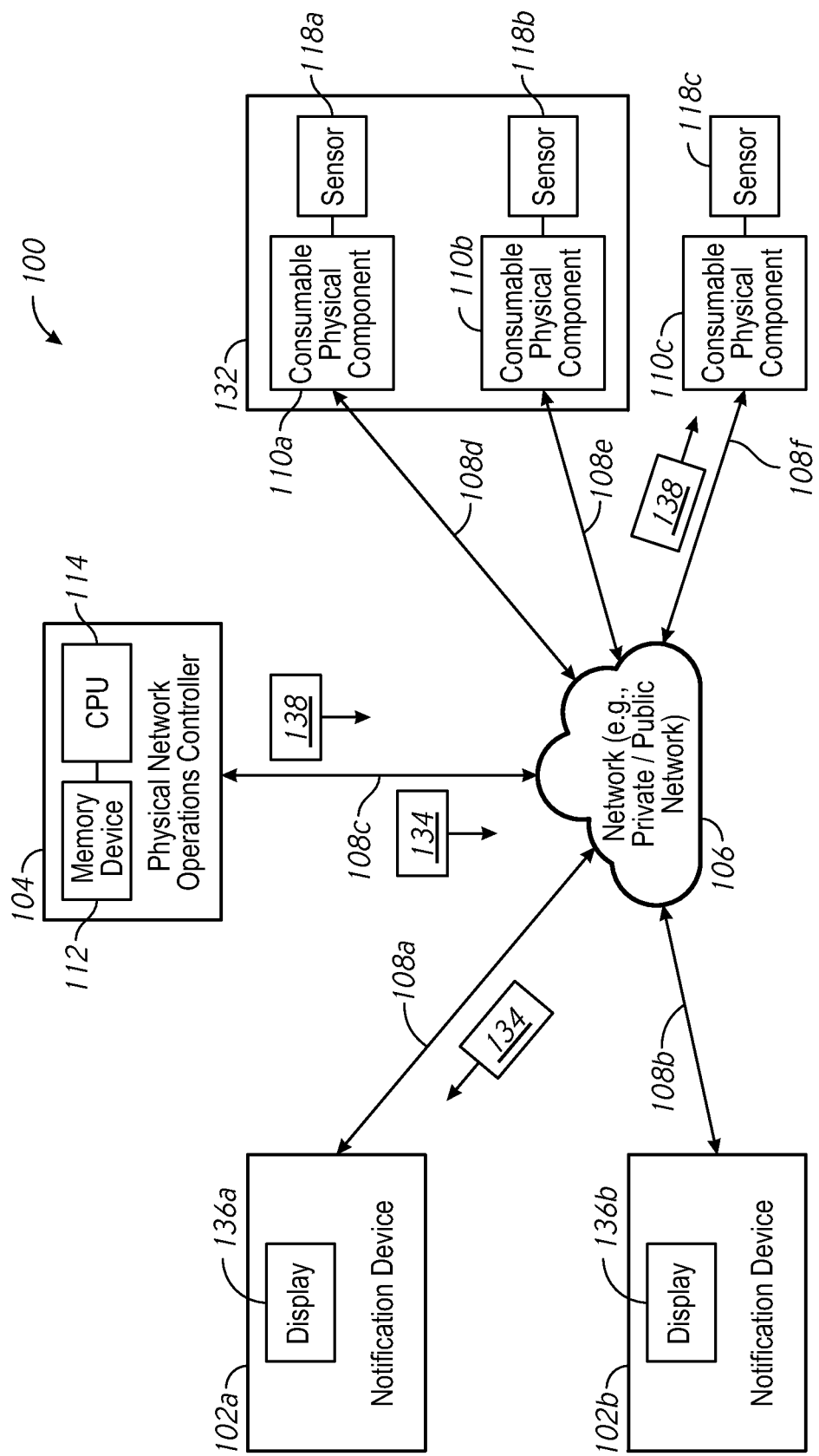
FIG. 4 is a block diagram depicting the operation of a physical network operations controller that is transmitting a maintenance event notification in accordance with some implementations.
Figure 5:
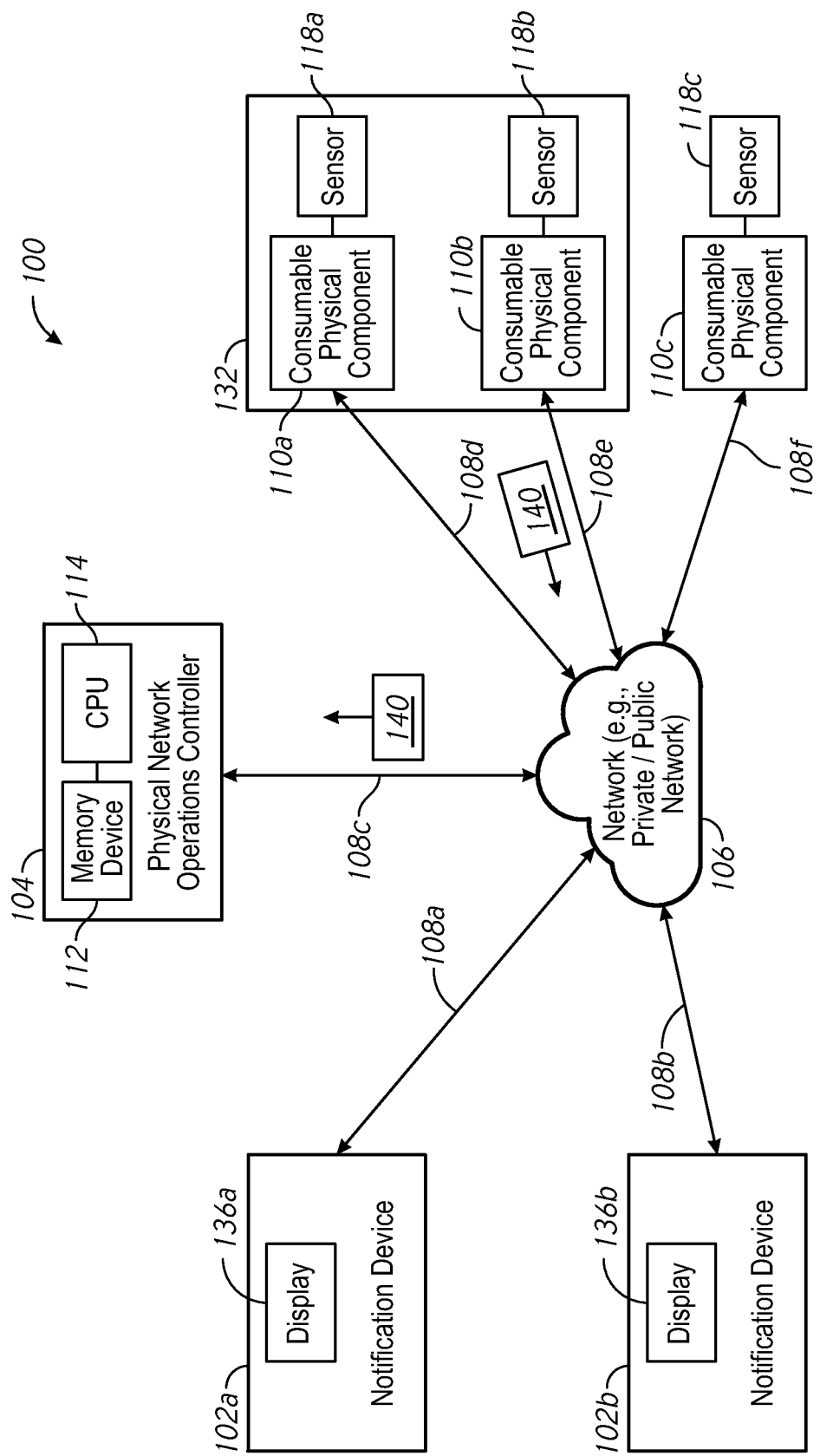
FIG. 5 is a block diagram depicting the operation of a consumable physical component that is responsively transmitting operating status data in accordance with some implementations.

In response to determining that at least one of the maintenance event trigger criteria 126 is met in respect of at least one of the consumable physical components 110 (e.g., in respect of the consumable physical component 110c), the CPU 114 is configured to generate a maintenance event notification 134 (FIG. 2) and to transmit the maintenance event notification 134 to at least one of the notification devices 102a and 102b. As shown in FIG. 4, the maintenance event notification 134 is transmitted to the notification device 102a. In some implementations, which one or more of the notification devices 102a and 102b the maintenance event notification 134 is transmitted to is based on the responsibilities or capabilities of the maintenance personnel accessing the notification devices 102a and 102b and the nature of the maintenance event (e.g., the maintenance event notification requiring replacement of a consumable physical component fan would be transmitted to a notification device accessed by the maintenance personnel charged with repairing and/or replacing fans). The maintenance event notification 134 is data suitable for providing a notification of the maintenance event at the notification device, such as a Short Message Service (SMS) text message and an email message to an email address that is accessible by the notification device. The maintenance event notification 134 indicates the consumable physical component requiring maintenance (e.g., the consumable physical component 110c) and at least one maintenance action to be performed in respect of the maintenance event trigger criteria 126 being met, either by the maintenance personnel accessing the notification device, the physical network operations controller 104 (e.g., order a replacement consumable physical component for the consumable physical component 110c, visually inspect the consumable physical component 110c) or, in some implementations, by the consumable physical component 110c. The notification devices 102a and 102b include any computing device suitable for receiving and providing the maintenance event notification 134 in a format for review by the maintenance personnel accessing the notification devices 102a and 102b. For example, in some implementations, the notification devices 102a and 102b include displays 136a and 136b for displaying the maintenance event notification 134.

The CPU 114 is also configured to transmit maintenance action data 138 to the consumable physical component 110c that indicates at least one of the maintenance actions that is to be performed based on the at least one maintenance event trigger criteria 126 that was met. For example, in some implementations, at least one of the maintenance actions to be performed by the consumable physical component 110c is to shut down during a specified time period in anticipation of service performed by maintenance personnel. Additionally, the CPU 114 may also transmit a command for consumable physical component 110c to display a status indication signifying a "shut down" or "maintenance required" state.

Associating or grouping one or more of the consumable physical components 110 together may be helpful for determining effective maintenance models, particularly in respect of aggregation of maintenance actions. As stated above, in some implementations, one or more of the consumable physical components 110 are associated with each other (e.g., the consumable physical components 110 includes at least one group of associate consumable physical components). For example, the consumable physical components 110a and 110b are located in the same region of data center 132. The consumable physical components 110a and 110b would then form at least one group of associated consumable physical components. The association between one or more of the consumable physical components 110 may also be in respect of a component type (e.g., all of the fans are associated with each other), expected lifespan or any other suitable basis for grouping one or more of the consumable physical components, such as a location or proximity of one or more of the components 110 to each other. In some implementations, the current operating status data 116a, 116b and 116c includes at least one of a group identifier, a component location and a component type.

In some implementations, in response to determining that the maintenance event trigger criteria 126 is met in respect of one or more of the consumable physical components 110, the physical network operations controller 104 reassesses the current operating state of other associated consumable physical components before generating the maintenance event notification 134. The current operating state of associated components may be helpful in determining the scope of the maintenance actions required to address the maintenance event trigger criteria 126 being met by any particular one of the consumable physical components 110. For example, in some implementations, the consumable physical component 110a is an air filter and the consumable physical component 110b is a fan located in the same region of a data center 132 and are members of at least one group of associated consumable physical components (e.g., associated by location). Upon determining the maintenance event trigger criteria 126 is met in respect of at least one member of a group of associated consumable physical components, the CPU 114 is configured to obtain follow-up operating status data for at least one remaining member of the group of associated consumable physical components. For example, upon determining the maintenance event trigger criteria 126 is met in respect of the consumable physical component 110a air filter, the CPU 114 polls the associated consumable physical component 110b in order to obtain follow-up operating status data 140 of the consumable physical component 110b (FIG. 5) and determine whether a maintenance event is imminent for the consumable physical component 110b.

In performing the activities of the LTP Layer, the physical network operations controller 104 tracks and analyzes the maintenance activities of the ERP Layer, Automation Layer and the Manual Layer to determine patterns in the maintenance activities and identify maintenance "hotspots" or areas of improvement for ongoing maintenance of the consumable physical components 110. For example, in some implementations, the CPU 114 is configured to store at the memory device 112, as performed maintenance actions data 142 (FIG. 2), the maintenance actions performed in response to the maintenance event trigger criteria 126 being met in respect of one or more of the consumable physical components 110. The performed maintenance actions data 142 may be in respect of maintenance actions performed over a selected period of time. The CPU 114 is also configured to determine the costs associated with performing the maintenance actions (e.g., cumulative labor costs and replacement consumable physical component costs) and regenerate the heuristic maintenance model data 122 based on the stored performed maintenance actions data 142 and the determined costs associated with performing the maintenance actions. The regenerated heuristic maintenance model data 122-1 (FIG. 2) takes into account the determined costs as well as the other considerations discussed above.

In some implementations, one or more of the consumable physical components 110 is configured to perform one or more of the maintenance actions indicated by the maintenance action data 138 without intervention by the maintenance personnel (i.e. one or more of the maintenance actions is self-addressable by one or more of the consumable physical components 110). For example, in some implementations, the consumable physical component 110c is an air filter that is configured to replace the used or occluded filter media with fresh filter media. The CPU 114 is configured to determine at least one of the maintenance actions indicated by the maintenance action data 138 (e.g., replacing the filter media) is self-addressable by the one or more consumable physical components 110 in which it was determined that the maintenance event trigger criteria 126 is met (e.g., the consumable physical component 110c air filter). The CPU 114 is further configured to direct the one or more consumable physical components 110 to perform the self-addressable maintenance action. For example, the maintenance action data 138 transmitted to the consumable physical component 110c air filter includes the maintenance action of replacing the occluded filter media with fresh filter media. The current operating status data 116c obtained after the consumable physical component 110c air filter may include confirmation that the filter media was replaced.

Figure 6:
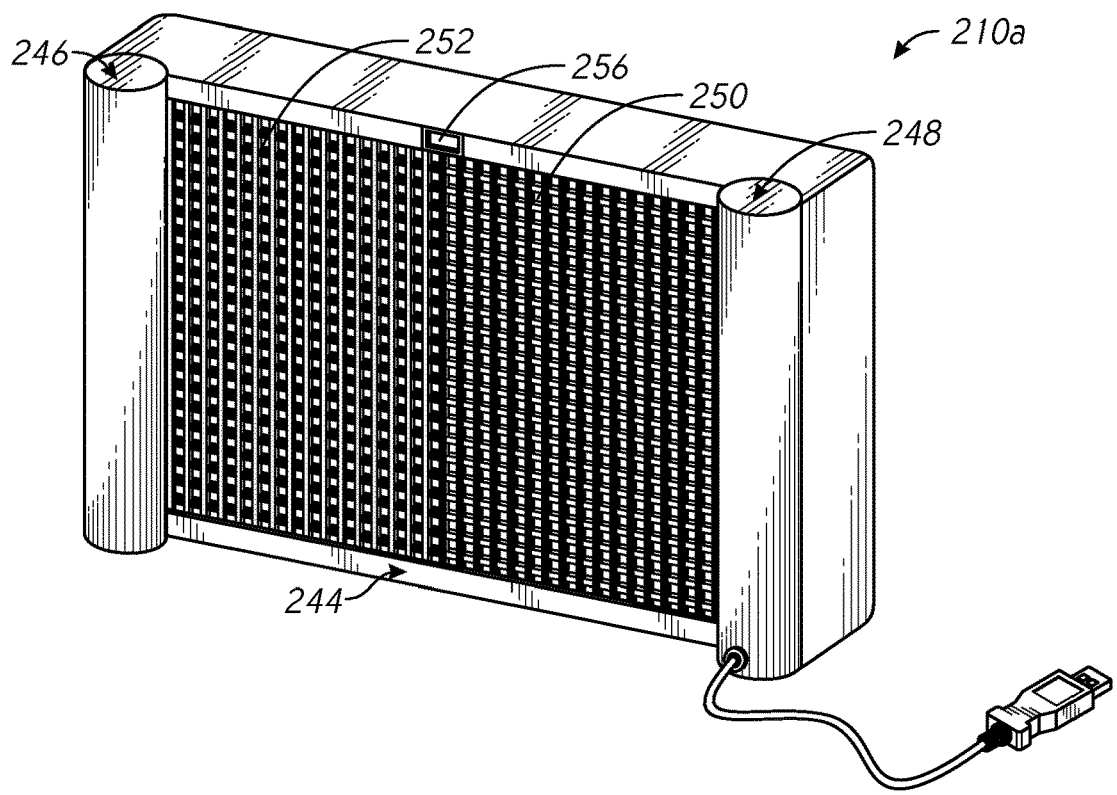
FIG. 6 is a perspective view of a consumable physical component in accordance with some implementations.
Figure 7:
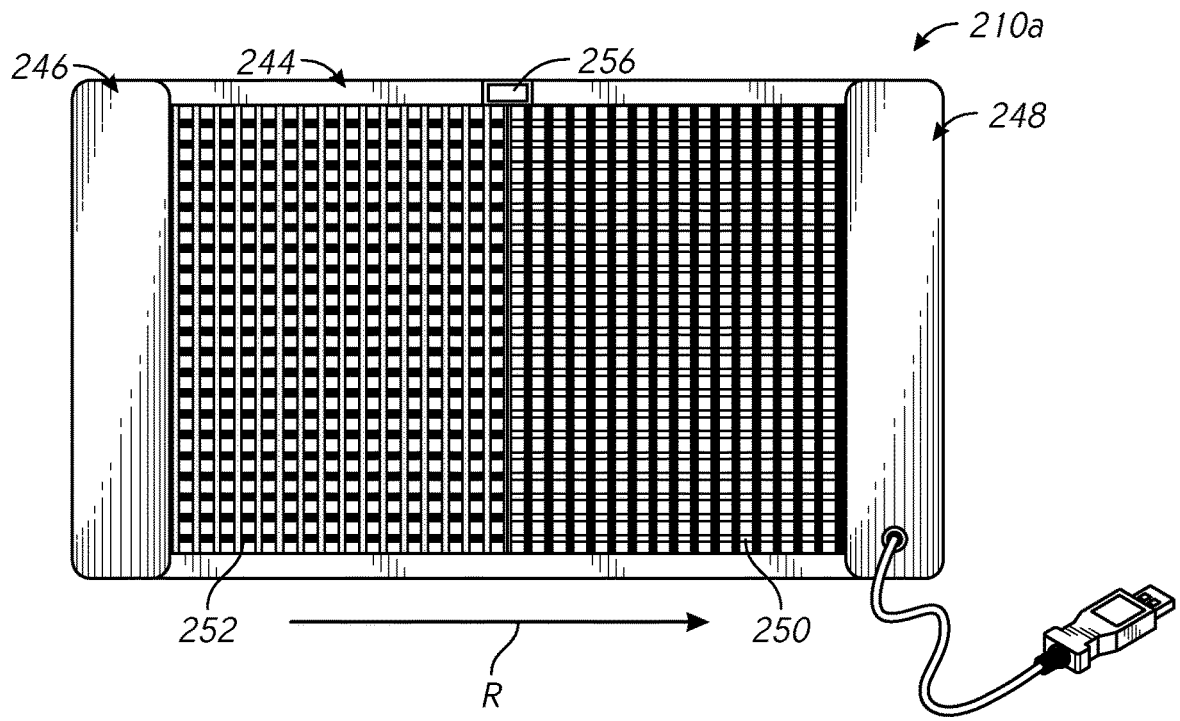
FIG. 7 is a front view of the consumable physical component of FIG. 6 in accordance with some implementations.
Figure 8:
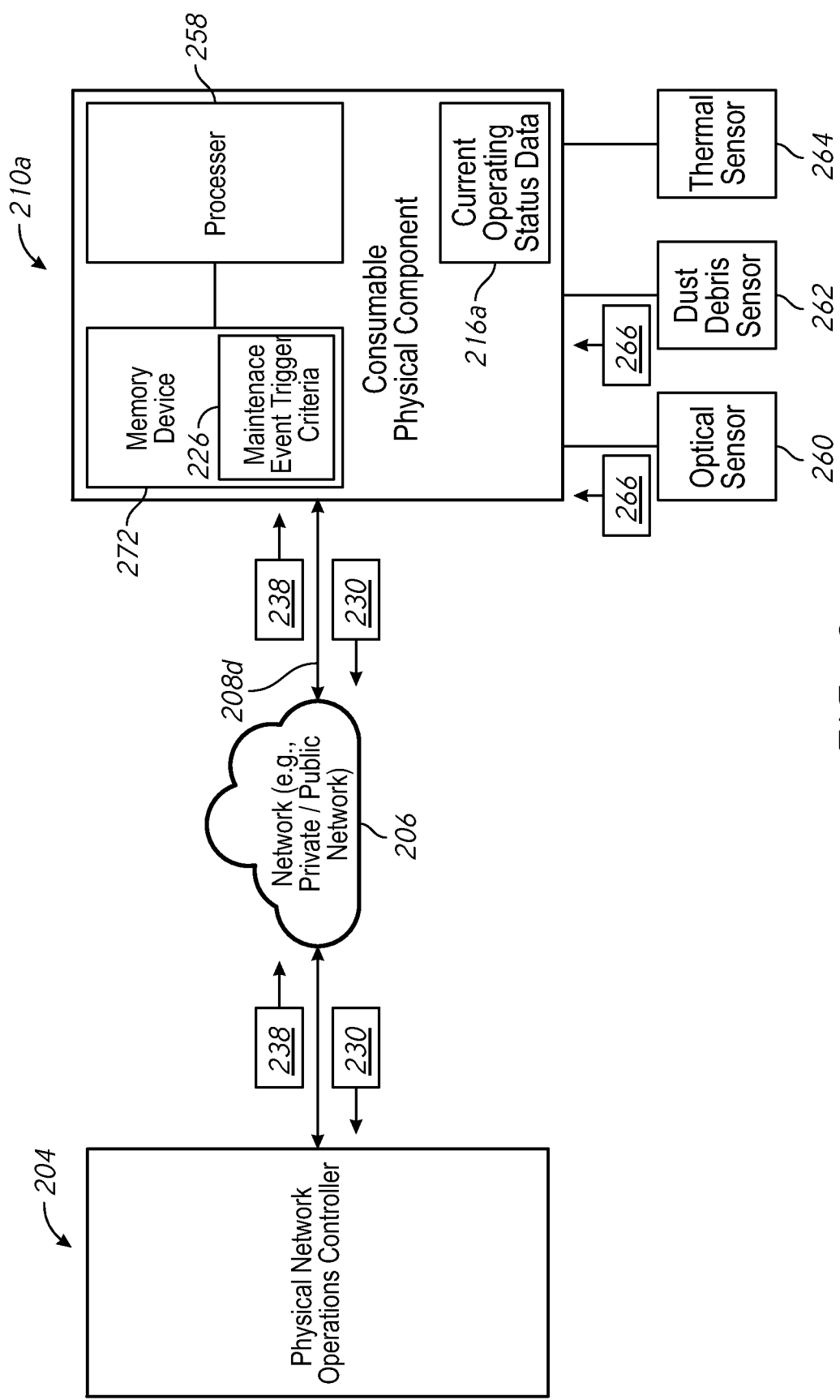
FIG. 8 is a block diagram depicting an arrangement of a consumable physical component in accordance with some implementations.

FIGS. 6 to 8 depict an example consumable physical component 210a that is configured to communicate with a physical network operations controller 204 over the network 206 and via the communication links 208c and 208d. The consumable physical component 210a, the physical network operations controller 204, the network 206 and the communication links 208c and 208d share at least some components with the system 100 to maintain consumable physical components of networking equipment, with like or similar elements numbered with like or similar numbers to those in the system 100, beginning with a "2" rather than a "1." The consumable physical component 210a is depicted as an air filter. However, it is understood that, in some implementations, the consumable physical component 210a is a fan or any other consumable physical component.

The consumable physical component 210a air filter includes filter media 244 that is provided by a supply roller 246. A drive roller 248 is configured to pull the filter media 244 across an air intake (not shown) of the consumable physical component 210a to replace occluded filter media 250 with fresh filter media 252. For example, as shown in FIG. 7, the drive roller 248 pulls the filter media 244 in the direction R towards the drive roller 248. The consumable physical component 210a is powered in any suitable manner. The filter media 244 also includes an indicia 256 to indicate the end of a first section of the filter media, such as the occluded filter media 250, and the beginning of a next section of the filter media 250, such as the fresh filter media 252.

As shown in FIGS. 6 and 7, the consumable physical component 210a is powered via power cord and plug 254 connected to a suitable power source (not shown). In some implementations, the consumable physical component 210a is powered over the Ethernet (PoE) and the power cord and plug 254 is an Ethernet cable and plug configured to pass electrical power and data to the consumable physical component 210a. In some implementations, the power cord and plug 254 is the communication link 208d.

The consumable physical component 210a includes a memory device 272 and a controller 258 interconnected with the memory device 272 (FIG. 8). The memory device 272 is configured to store a maintenance event trigger criteria 226. In some implementations, the maintenance event trigger criteria 226 are transmitted from the physical network operations controller 204. In some implementations, the maintenance event trigger criteria 226 are pre-stored at the memory device 272 prior to installation of the consumable physical component 210*a*. In some implementations, the maintenance event trigger criteria 226 includes at least one of an indication of an operational failure of at least one subcomponent of the consumable physical component 210*a*, an indication that an expected lifespan of the consumable physical component 210*a* has been reached, an indication that a selected thermal limit of the consumable physical component 210*a* has been reached, an indication that a performance level of at least one subcomponent of the consumable physical component 210*a* is below a selected performance level, and a scheduled maintenance event for the consumable physical component 210*a* is due.

The controller 258 is configured to determine a current operating status of the consumable physical component 210*a* and generate current operating status data 216*a* based on the determined operating status of the consumable physical component 210*a*. For example, in some implementations, the controller 258 is configured to determine at least one of the power consumption of the consumable physical component 210*a*, an actual performance level of the consumable physical component 210*a* and remaining expected lifespan of the consumable physical component 210. In some implementations, the current operating status data 216*a* indicates whether a subcomponent of the consumable physical component 210*a*, such as the drive roller 248 has failed. In some implementations, the controller is configured to periodically transmit the current operating status data 216*a* to the physical network operations controller 204.

In some implementations, the controller 258 is configured to obtain operating conditions data 266 for the consumable physical component 210*a* from at least one sensor associated with the consumable physical component 210*a*. The controller 258 is configured to generate the current operating status data 216*a* based on the obtained operating conditions data 266. In some implementations, the controller 258 is configured to poll the at least one associated sensor. In some implementations, the at least one associated sensor transmits the operating conditions data 266 without prompting from the controller 258. As shown in FIG. 8, the consumable physical component 210*a* is associated with three sensors, an optical sensor 260, a dust debris sensor 262 and a thermal sensor 264. It is understood that "associated" means that a sensor is proximate (e.g., within sensor range) to a consumable physical component and configured to take measurements of information that may be relevant to the operating status of the consumable physical component. The associated sensor may be connected to the consumable physical component via any suitable combination of wired or wireless connections.

In FIG. 8, the controller 258 obtains the operating conditions data 266 from the optical sensor 260 and the dust debris sensor 262. The optical sensor 220 is configured to detect the indicia 256 and the position of the indicia 256 relative to the drive roller 248. The dust debris sensor 262 is configured to detect the amount of dust and debris in a section of the filter media 244. In some implementations, the capabilities of the optical sensor 260, the dust debris sensor 262 and the thermal sensor 264 are combined in a single sensor.

The controller 258 is configured to determine, based on the current operating status data 216*a*, that at least one of the maintenance event trigger criteria 226 is met. In some implementations, the controller 258 is configured to compare the current operating status data 216*a* with the maintenance event trigger criteria 226 to determine that at least one of the maintenance event trigger criteria 226 is met. For example, the operating conditions data 266 obtained from the dust debris sensor 262 may indicate that the amount of dust and debris in a section of the filter media 244 has reached a threshold occlusion limit indicated in the maintenance event trigger criteria 226, such as in respect of the occluded filter media 250. In some implementations, the threshold occlusion is selected based on heuristic model data generated by the physical network operations controller 204, such as the heuristic model data 122.

In some implementations, the controller 258 is configured to transmit notification data 230 to the physical network operations controller 204 that indicates at least one of the maintenance event trigger criteria 226 is met in respect of the consumable physical component 216*a*. The controller 258 is configured to receive maintenance action data 238 that indicates at least one maintenance action that is to be performed by the controller 258 in response to the maintenance event trigger criteria 226 being met. The controller 258 is also configured to perform the indicated maintenance action. For example, in some implementations, the maintenance action data 238 directs the controller 258 to shut down the consumable physical component 210*a* in anticipation of manual maintenance that is to be performed on the consumable physical component 210*a*.

Figure 9:
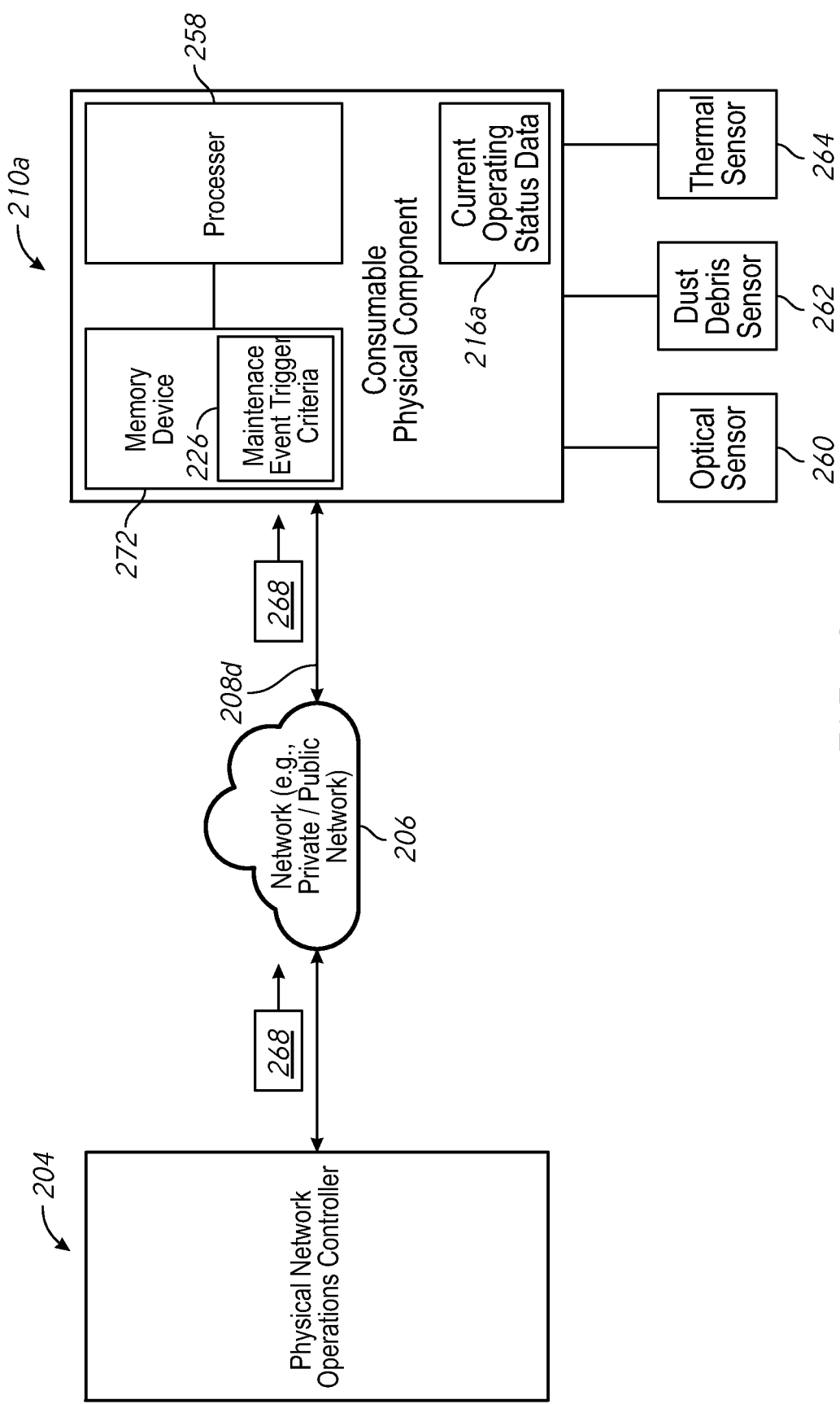
FIG. 9 is a block diagram depicting the operation of a consumable physical component that is receiving maintenance action data according to some implementations.

In some implementations, the at least one maintenance action includes the consumable physical component 216*a* waiting to receive subsequent maintenance action data 268 (FIG. 9) from the physical network operations controller 204 indicative of at least one new maintenance action. For example, in response to the notification data 230, the physical network operations controller 204 orders a replacement subcomponent for the consumable physical component 210*a* (e.g., a replacement cartridge of the filter media 244). Since it may take some time for the maintenance personnel to receive the replacement component, it may be desirable for the consumable physical component 210*a* to continue running until delivery of the replacement subcomponent. When the replacement component arrives, the physical network operations controller 204 will transmit subsequent maintenance action data 268 directing the consumable physical component 210*a* to shut down in anticipation of imminent replacement of the subcomponent.

Figure 10:
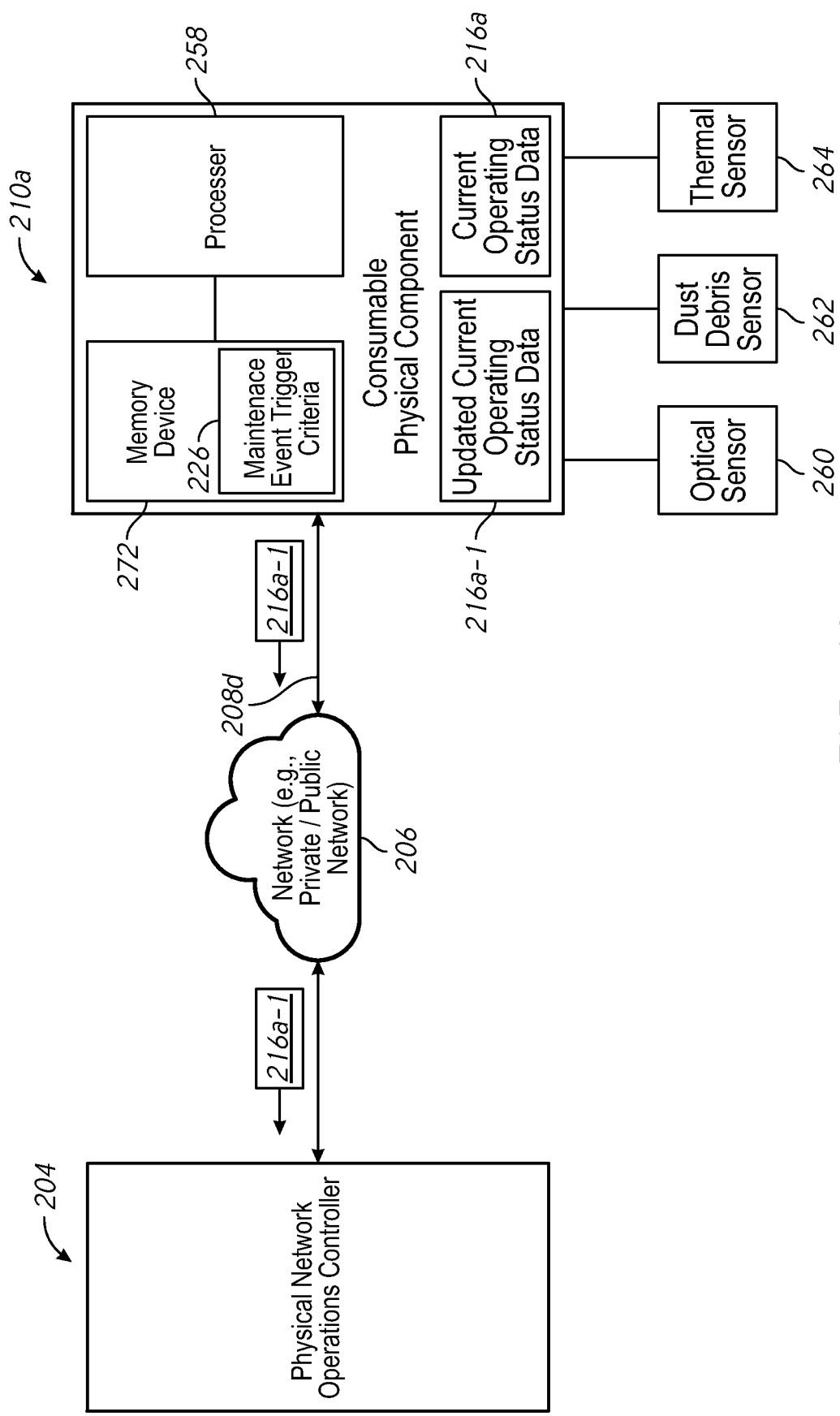
FIG. 10 is a block diagram depicting the operation of a consumable physical component that is transmitting operating status data according to some implementations.
Figure 11:
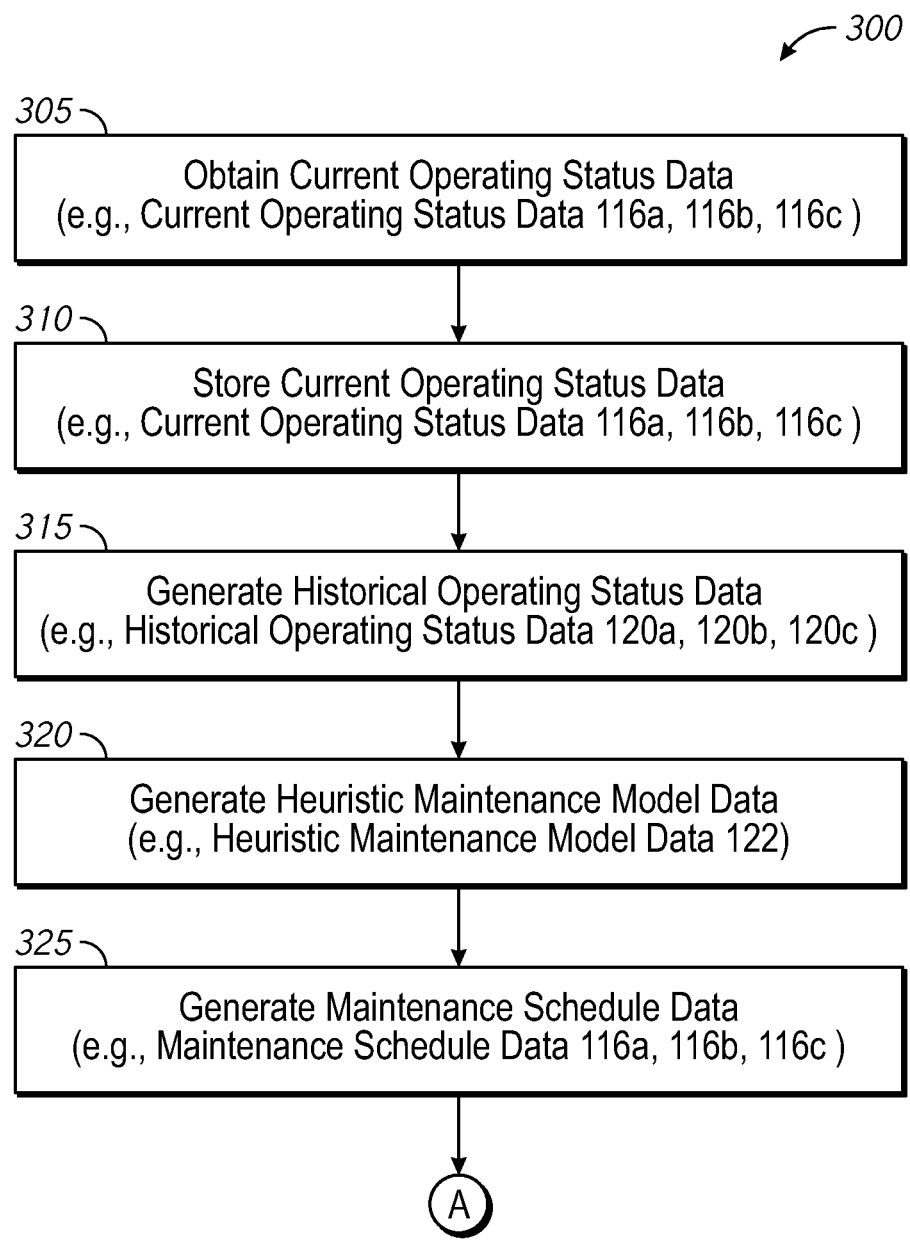
FIG. 11 is a flowchart representation of a method of maintaining consumable physical components in a network according to some implementations.
Figure 12:
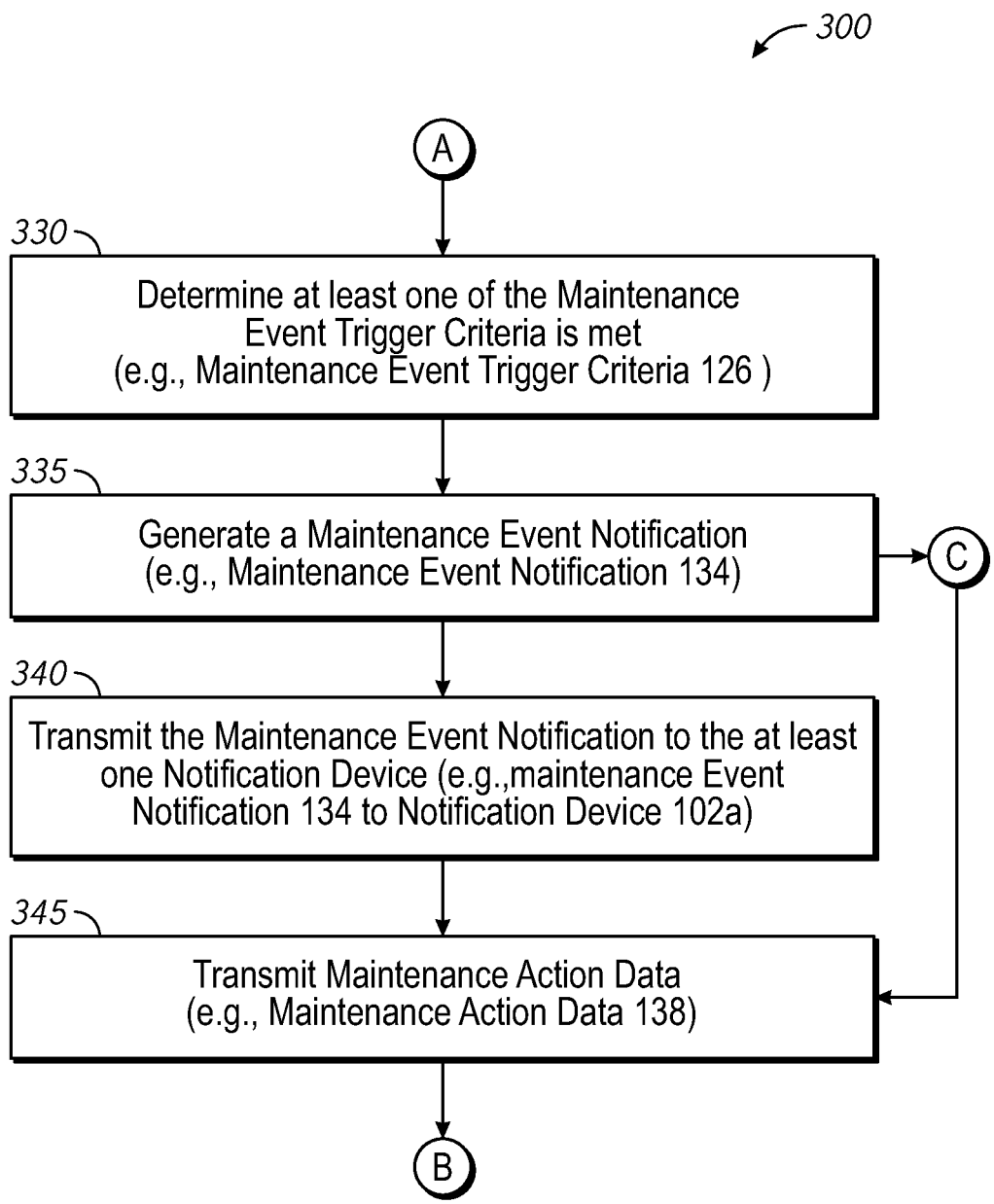
FIG. 12 is a flowchart representation of a continuation of the method depicted in FIG. 11 in accordance with some implementations.
Figure 13:
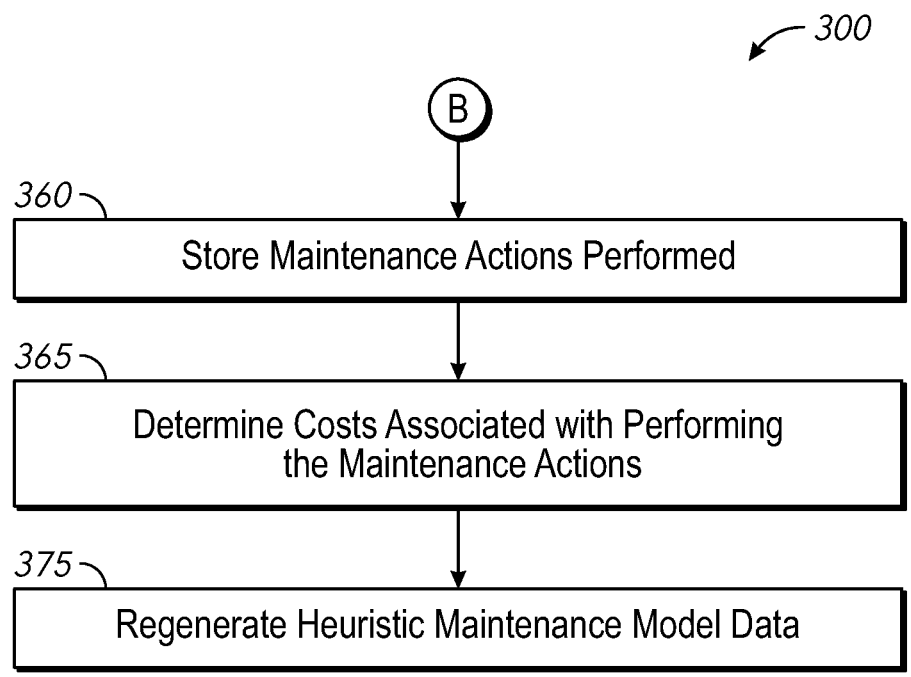
FIG. 13 is a flowchart representation of a continuation of the method depicted in FIGS. 11 and 12 in accordance with some implementations.

In some implementations, the consumable physical component 216*a* takes a more active role in addressing the maintenance event trigger criteria 226 being met. In some implementations, the controller 258 is configured to determine at least one self-addressable action associated with maintenance event trigger criteria 226 being met and to perform the at least one self-addressable action. For example, if the maintenance event trigger criteria 226 was met by the occluded filter media 250 reaching a threshold occlusion limit, then the controller 258 would direct the drive roller 248 to pull the filter media 244 in the direction R until the optical sensor 260 determines that indicia 256 is in a position that indicates the occluded filter media 250 has been replaced by the fresh filter media 252 across the air intake (not shown) of the consumable physical component 210*a*. The controller 258 is further configured to generate the updated current operating status data 216*a*-1, indicating that the at least one self-addressable task was performed by the consumable physical component 210*a*, and to transmit the updated current operating status data to the physical network operations controller 204 (FIG. 10).

FIGS. 11 to 14 depict an example method 300 of maintaining consumable physical components of networking equipment. For the purpose of explanation, the method 300 is described with reference to the structures depicted in FIGS. 1 to 10. However, other structures may be used besides those depicted in FIGS. 1 to 10.

At block 305, the CPU 114 obtains the current operating status data 116a, 116b and 116c. As stated above, the CPU 114 may obtain the current operating status data 116a, 116b and 116c in various ways. For example, in some implementations, the CPU 114 polls or requests the current operating status data 116a, 116b and 116c from one or more of the consumable physical components 110. In some implementations, one or more of the consumable physical components 110 transmits the current operating status data 116a, 116b and 116c to the physical network operations controller 104. In some implementations, the CPU 114 obtains the current operating status data 116a, 116b and 116c by a combination of polling the consumable physical components 110 and transmissions of the current operating status data 116a, 116b and 116c from one or more of the consumable physical components 110. In some implementations, the current operating status data 116a, 116b and 116c is obtained in real-time from the consumable physical components 110. The current operating status data 116a, 116b and 116c is stored in the memory device 112 at block 310.

At block 315, the CPU 114 generates the historical operating status data 120a, 120b and 120c based on the stored current operating status data 116a, 116b and 116c. At block 320, the CPU 114 generates the heuristic maintenance model data 122 for the consumable physical components 110 based on at least one of the current operating status data 116a, 116b and 116c and the historical operating status data 120a, 120b and 120c. As stated above, the heuristic maintenance model data 122 defines maintenance actions 124 and the maintenance event trigger criteria 126 for the consumable physical components 110. At block 325, the maintenance schedule data 128 is generated by the CPU 114 based on the heuristic maintenance model data 122.

Figure 3:
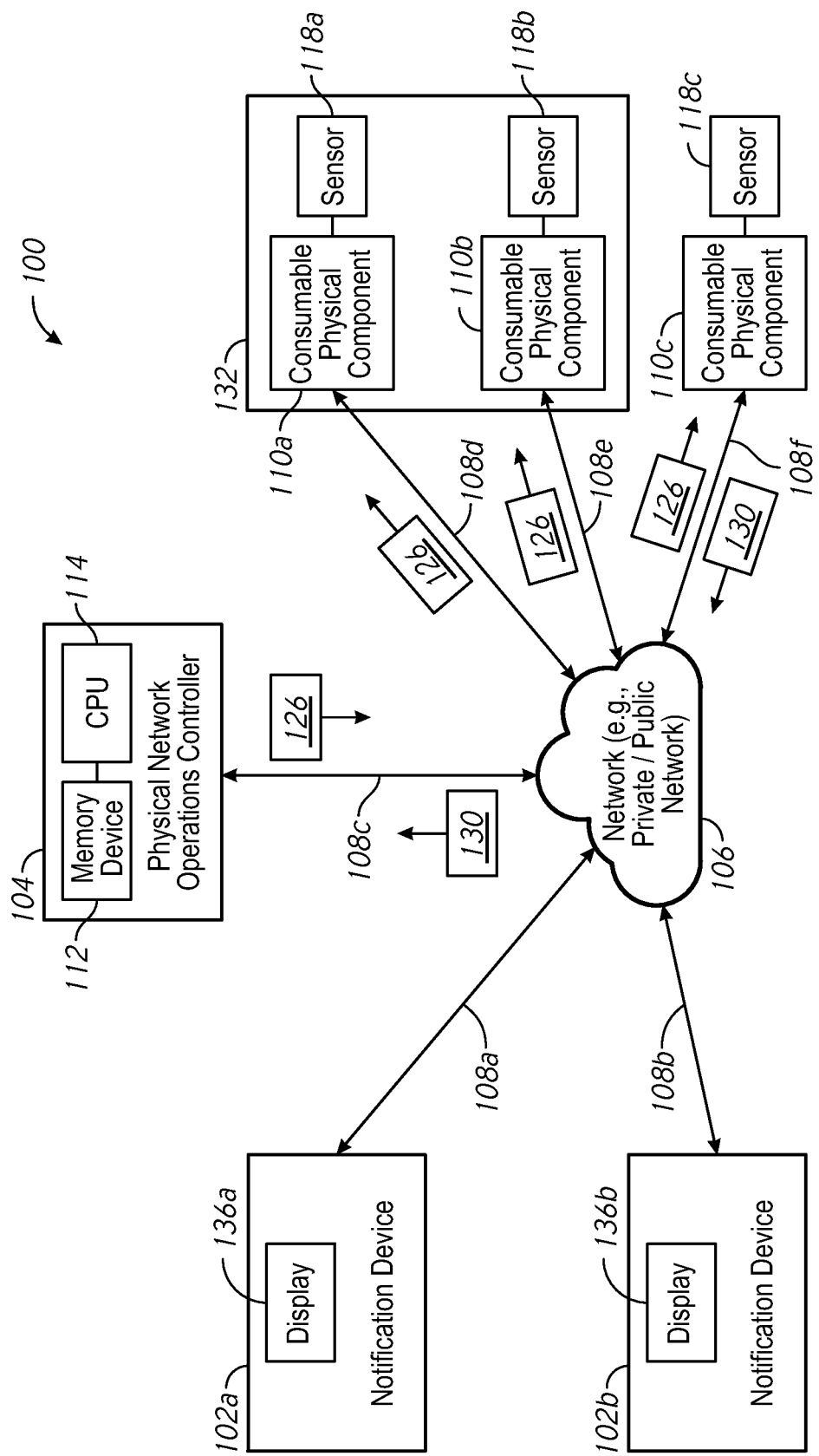
FIG. 3 is a block diagram depicting the operation of a physical network operations controller that is transmitting a maintenance event trigger criteria in accordance with some implementations.

At block 330 (FIG. 12), the CPU 114 determines that at least one of the maintenance event trigger criteria 126 is met in respect of at least one of the consumable physical components 110. For example, in some implementations, the CPU transmits the maintenance event trigger criteria 126 to the consumable physical components 110 (as shown in FIG. 3) and each one of the consumable physical components 110 compares the maintenance event trigger criteria 126 to the current operating status data of a respective one of the consumable physical components 110 (e.g., the consumable physical component 110c compares the maintenance event trigger criteria 126 against the current operating status data 116c). If a consumable physical component, such as the consumable physical component 110c, determines that at least one of the maintenance event trigger criteria 126 is met, then the consumable physical component transmits notification data 130 indicating that the at least one of the maintenance event trigger criteria 126 is met. In some implementations, the notification data 130 includes an indication of which of the maintenance event trigger criteria 126 is met in respect of the consumable physical component 116c. The CPU 114 determines that at least one of the maintenance event trigger criteria 126 is met, particularly in respect of the consumable physical component 116c, by receiving the notification data 130.

At block 335 a maintenance event notification 134 is generated by the CPU 114 and transmitted to at least one of the notification devices 102a and 102b (as shown in FIGS. 2 and 4). As stated above, the maintenance event notification 134 indicates the consumable physical component requiring maintenance (e.g., the consumable physical component 110c) and at least one maintenance action to be performed in respect of the maintenance event trigger criteria 126 being met, either by the maintenance personnel accessing the notification device, the physical network operations controller 104 (e.g., order a replacement consumable physical component for the consumable physical component 110c, visually inspect the consumable physical component 110c) or, in some implementations, by the consumable physical component 110c.

Figure 14:
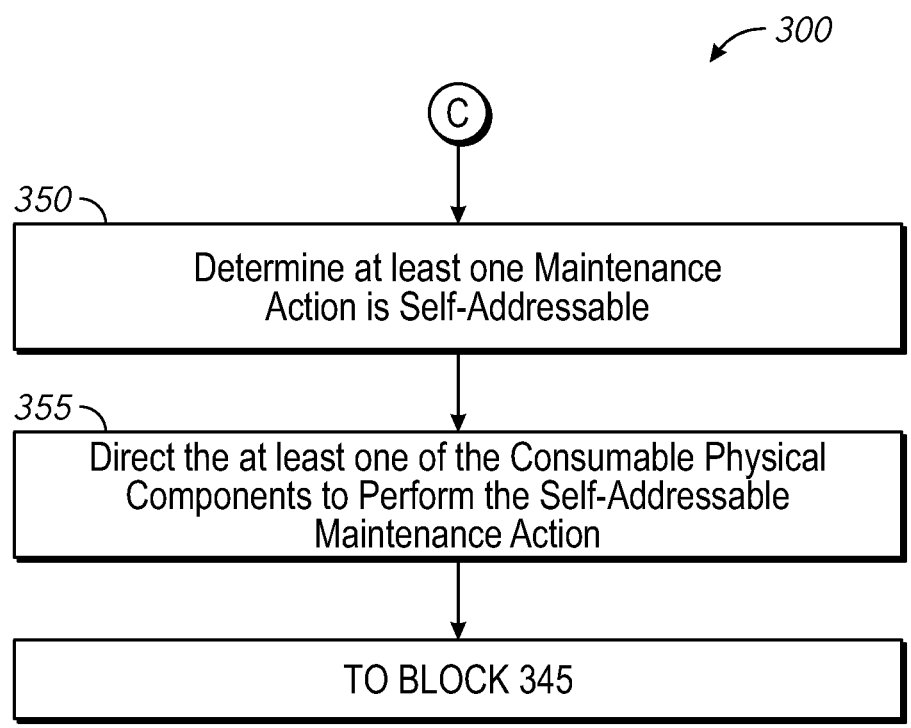
FIG. 14 is a flowchart representation of a continuation of the method depicted in FIGS. 11-13 in accordance with some implementations.

In some implementations, in generating the maintenance event notification 134, the CPU 114 determines that at least one of the maintenance actions to be performed is self-addressable by the consumable physical components 110 which met the maintenance event trigger criteria 126 (e.g., the consumable physical component 110c) (see block 350 in FIG. 14). For example, in some implementations, the consumable physical component 110c is an air filter with similar capabilities to the consumable physical component 210a air filter. The consumable physical component 110c may have a section of filter media that is occluded beyond a threshold occlusion limit set in the maintenance event trigger criteria 126, similarly to the occluded filter media 250. The consumable physical component 110c may also be configured to replace the occluded filter media in a manner similar to the consumable physical component 210a. After determining that at least one of the maintenance actions to be performed in respect of the maintenance event trigger criteria 126 being met is self-addressable, the CPU 114, at block 355, directs the consumable physical components 110 that met the maintenance event trigger criteria 126 to perform the self-addressable maintenance action. At block 345, the CPU 114 transmits, to the consumable physical components 110 which met the maintenance event trigger criteria 126, the maintenance action data 138 indicating at least one of the maintenance actions that are to be performed based on which of the maintenance event trigger criteria 126 are met. In order to direct the consumable physical components 110 that met the maintenance event trigger criteria 126 to perform the self-addressable maintenance action, the consumable physical component 110c, the maintenance action data 138 includes the maintenance action of replacing the occluded filter media with fresh filter media.

At block 360 (FIG. 13), in some implementations, the CPU 114 stores at the memory device 112 the maintenance actions performed in response to the maintenance event trigger criteria 126 being met in respect of one or more of the consumable physical components 110. For example, in some implementations, the maintenance actions performed are stored as the performed maintenance actions data 142 (FIG. 2).

At blocks 365 and 375, CPU 114 determines the costs associated with performing the maintenance actions (e.g., cumulative labor costs and replacement consumable physical component costs) and regenerates the heuristic maintenance model data 122 based on the stored performed maintenance actions data 142 and the determined costs associated with performing the maintenance actions. The regenerated heuristic maintenance model data 122-1 (FIG. 2) takes into account the determined costs as well as other considerations discussed above.

Those skilled in the art will appreciate that in some implementations, the functionality of the system 100, the consumable physical component 210a and the method 300 is implemented using pre-programmed hardware or firmware elements (e.g., application specific integrated circuits (ASICs), electrically erasable programmable read-only memories (EEPROMs), etc.), or other related components.

In some implementations, the memory device 112 and the memory device 272 are programmable logic devices that include instructions and program modules to achieve the functionality of the system 100, the consumable physical component 210a and the method 300. The instructions and program modules perform the operations of the Automation Layer, ERP Layer and LTP Layer.

Figure 15:
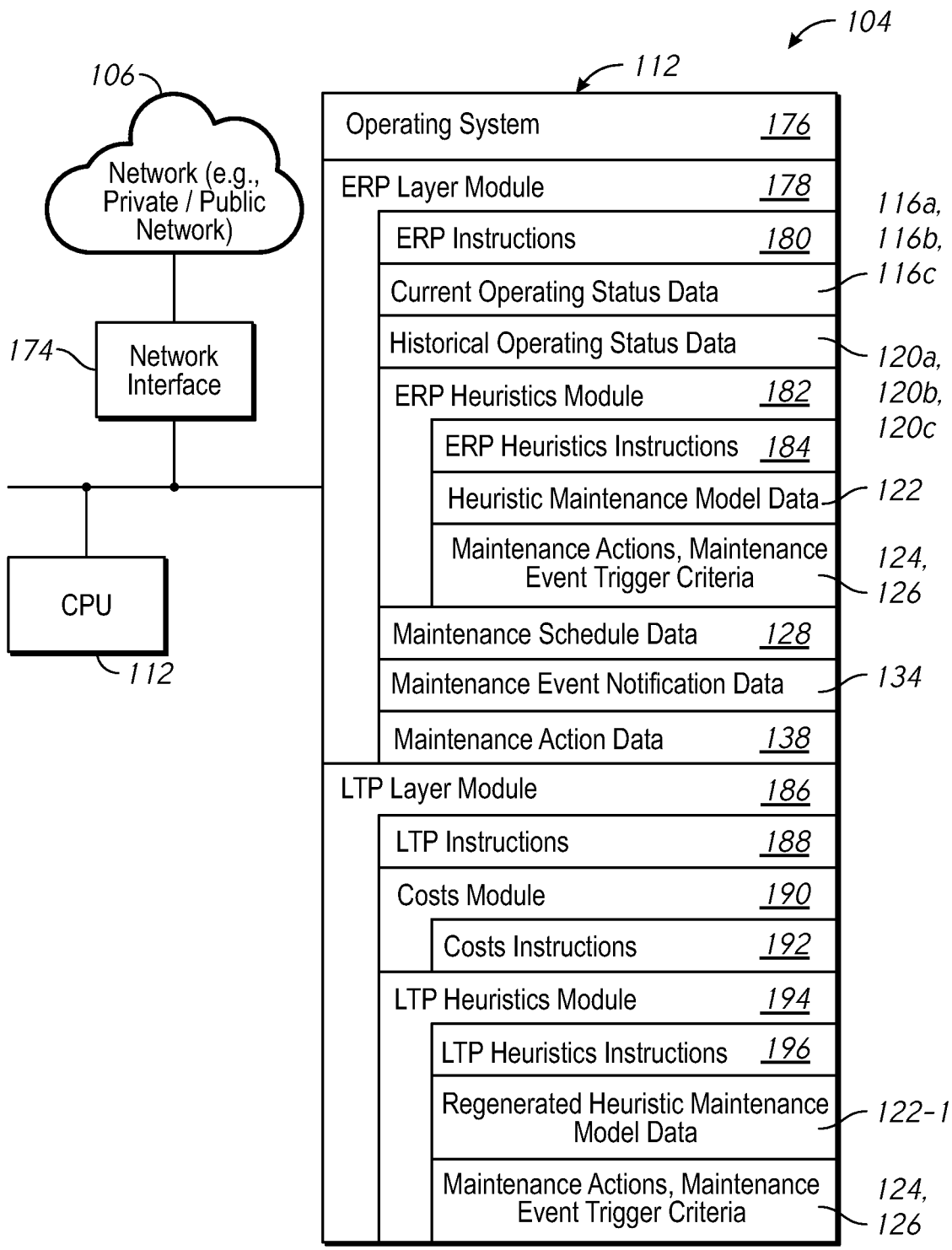
FIG. 15 is a block diagram of a physical network controller in accordance with some implementations.
Figure 16:
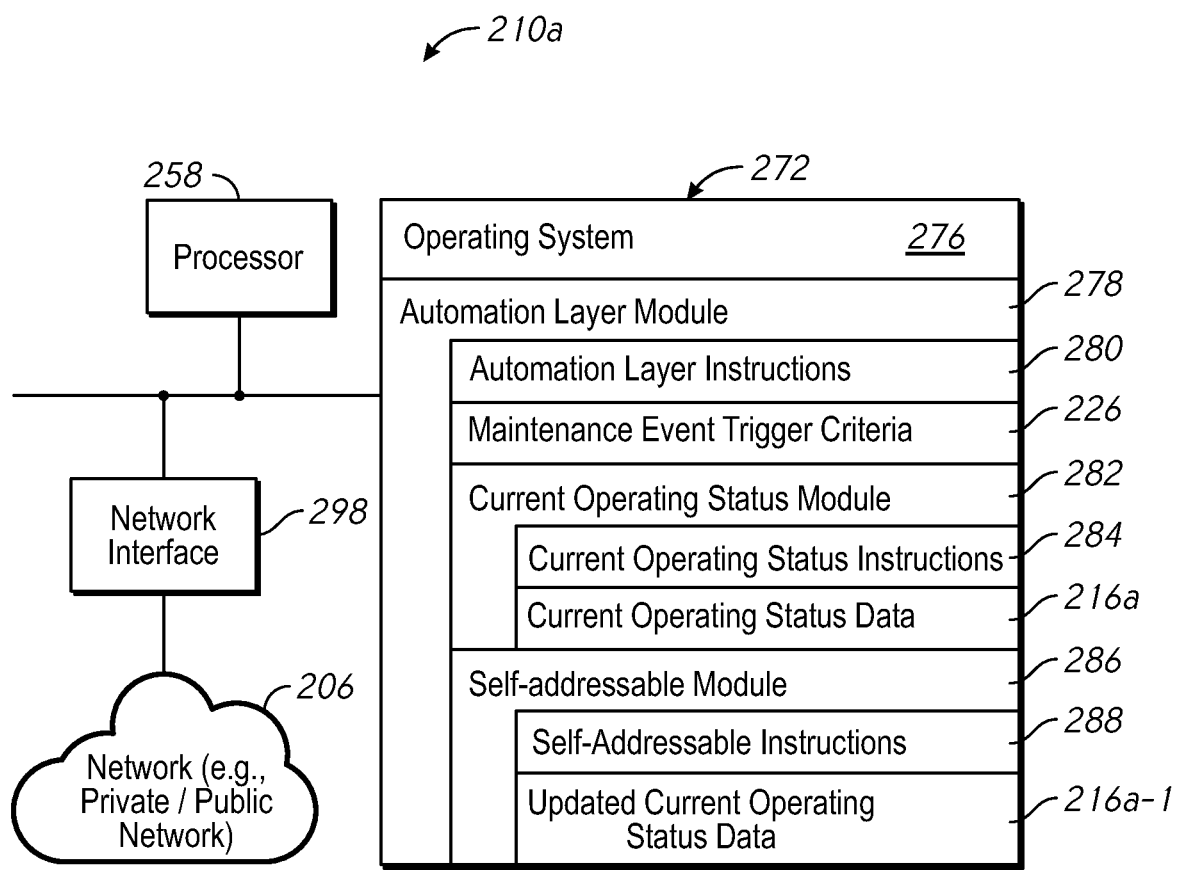
FIG. 16 is a block diagram of a consumable physical component in accordance with some implementations.

FIGS. 15 and 16 depict example implementations of the ERP Layer, LTP Layer and Automation Layer in which the memory device 112 of the physical network operations controller 104 and the memory device 272 of the consumable physical component 210a are programmable logic devices. In the example implementation of the physical network controller 104 shown in FIG. 15, the memory device 112 includes an operating system 176 that oversees the functions of the ERP Layer Module 178 and the LTP Layer Module 186. The ERP Layer Module 178 includes ERP instructions 180, the current operating status data 116a, 116b, 116c, the historical operating status data 120a, 120b and 120c, an ERP heuristics module 182, ERP heuristics instructions 184, the heuristic maintenance model data 122, maintenance actions 124 and maintenance trigger criteria 126. The ERP Layer also includes the maintenance schedule data 128, the maintenance event notification data 134 and the maintenance action data 138. The LTP Layer module 186 includes LTP instructions 188, a costs module 190, costs instructions 192, an LTP heuristics module 194, LTP heuristics instructions 196, the heuristic maintenance model data 122-1, the maintenance actions 124 and the maintenance event trigger criteria 126. As shown, the CPU 112 is interconnected with the memory device 112 and the physical network controller 104 is connected to the network 106 via a network interface 174.

In the example implementation of the consumable physical component 210a shown in FIG. 16, the memory device 272 includes an operating system 276 that oversees the functions of the Automation Layer module 278. The Automation Layer Module 278 includes automation layer instructions 280 and the maintenance event trigger criteria 226. The Automation Layer module 278 also includes a current operating status module 282 that includes current operating status instructions 284 and the current operating status data 216a. In the implementation of the consumable physical component 210a depicted, the controller 258 is configured to determine at least one self-addressable action associated with maintenance event trigger criteria 226 being met and to perform the at least one self-addressable action. In order to provide this functionality, the Automation Layer module 278 includes a self-addressable module 286. The self-addressable module includes self-addressable instructions 288 and the updated current operating status data 216a-1 (generated by the controller 258). As shown, the controller 258 is interconnected with the memory device 272 and the consumable physical component 210a is connected to the network 206 via a network interface 298.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A device comprising:
a non-transitory memory device configured to store maintenance event trigger criteria associated with a consumable physical component for use in maintaining a preferred operating condition for network infrastructure equipment, wherein the consumable physical component is an air filter; and
a controller, included in the consumable physical component, coupled to the non-transitory memory configured to:
determine a current operating status of the consumable physical component;
generate current operating status data based on the determined current operating status;
determine, based on the current operating status data and current operating status data of at least one other consumable physical component coupled to the consumable physical component via the network infrastructure equipment, that at least one of the maintenance event trigger criteria is met, wherein the at least one of the maintenance event trigger criteria is the air filter needs to be replaced; and based on the at least one of the maintenance event trigger criteria being determined to have been met, perform one or more remedial actions that are self-addressable by the consumable physical component, wherein the one or more remedial actions include controlling a drive roller to pulls filter media across an air intake to change the air filter when the controller determines an air filter change is needed.

2. The device of claim 1, wherein the one or more remedial actions further include the controller transmitting to a physical network operations controller notification data indicating that the at least one of the maintenance event trigger criteria is met, receiving maintenance action data from the physical network operations controller, wherein the maintenance action data indicates at least one maintenance action the controller is to perform in response to the at least one maintenance event trigger criteria being met, and perform the at least one maintenance action.

3. The device of claim 1, wherein the one or more remedial actions further include the controller determining at least one self-addressable maintenance action associated with the at least one of the maintenance event trigger criteria, perform the at least one self-addressable maintenance action, generate updated current operating status data indicating that the at least one self-addressable task has been performed, and transmit the updated current operating status data to the physical network operations controller.

4. The device of claim 1, wherein the controller is further configured to:
obtain operating conditions data from at least one sensor associated with the consumable physical component; and
generate the current operating status data based on at least one of the determined current operating status and the operating conditions data.

5. The device of claim 1, wherein the maintenance event trigger criteria comprises at least one of:
an indication of an operational failure of at least one subcomponent of the consumable physical component;
an indication that an expected lifespan of at least one subcomponent of the consumable physical component has been reached;
an indication that a selected thermal limit of the consumable physical component has been reached;
an indication that an actual performance level of at least one subcomponent of the consumable physical component is below a selected performance level associated with the at least one subcomponent; and
a scheduled maintenance event for the consumable physical component is due.

6. A system comprising:
a physical network operations controller configured to communicate with at least one notification device and a plurality of consumable physical components for use in maintaining a preferred operating condition for network infrastructure equipment, wherein the plurality of consumable physical components are air filters and the physical network operations controller includes:
a non-transitory memory and a controller interconnected with the non-transitory memory, wherein the controller is configured to:
obtain current operating status data from the plurality of consumable physical components for storage at the memory device;
generate historical operating status data for the plurality of consumable physical components based on the stored current operating status data; and
generate heuristic maintenance model data for the plurality of consumable physical components based on at least one of the current operating status data and the historical operating status data, wherein the heuristic maintenance model data defines maintenance actions and maintenance event trigger criteria for the plurality of consumable physical components, and generating the heuristic maintenance model data includes,
identifying relationships between maintenance actions of consumable physical components,
aggregating two or more maintenance actions based on the relationships,
defining the maintenance event trigger criteria for the plurality of consumable physical components in order to maintain the preferred operating condition, wherein a respective maintenance event trigger criteria for a particular consumable physical component is based on the aggregation of the maintenance actions,
determining the maintenance event trigger criteria is met for at least one of the plurality of consumable physical components, wherein the maintenance event trigger criteria is one or more of the air filters needs to be replaced, and
in response to the maintenance event trigger being met, controlling the at least one consumable physical component to perform one or more remedial actions that are self-addressable by the at least one consumable physical component, wherein the one or more remedial actions include controlling a driver roller to pull filter media across an air intake to change the air filter when the controller determines an air filter change is needed.

7. The system of claim 6, wherein the controller is further configured to:
generate maintenance schedule data for the plurality of the consumable physical components based on the heuristic maintenance model data.

8. The system of claim 6, wherein the controller is further configured to:
determine at least one of the maintenance event trigger criteria is met in respect of at least one of the plurality of consumable physical components; and
in response to determining the at least one maintenance event trigger criteria is met,
generate a maintenance event notification, and
transmit the maintenance event notification to the at least one notification device; and
transmit to the at least one of the plurality of consumable physical components maintenance action data indicating at least one of the maintenance actions to be performed based on the at least one of the maintenance event trigger criteria being met.

9. The system of claim 8, wherein the controller is further configured to:
transmit the maintenance event trigger criteria to the plurality of consumable physical components; and
determine at least one of the maintenance event criteria is met by receiving notification data from at least one of the plurality of the consumable physical components indicating that the at least one of the maintenance event trigger criteria is met.

10. The system of claim 6, wherein the plurality of consumable physical components comprises at least one group of associated consumable physical components.

11. The system of claim 10, wherein the current operating status data further includes, for each one of the plurality of consumable physical components, at least one of a component identifier, a group identifier, a component location and a component type.

12. The system of claim 6, wherein the controller is further configured to:
store, at the memory, the maintenance actions performed in response to the at least one of the maintenance event trigger criteria being met;
determine costs associated with performing the maintenance actions; and
regenerate the heuristic maintenance model data based on the stored performed maintenance actions and the determined costs associated with performing the maintenance actions.

13. The system of claim 6, wherein the maintenance event notification identifies the maintenance actions to be performed and the at least one of the plurality of the consumable physical components.

14. The system of claim 6, wherein the controller is further configured to:
determine at least one of the maintenance actions is self-addressable by the at least one of the plurality of consumable physical components; and
direct the at least one of the plurality of consumable physical components to perform the at least one maintenance action.

15. A method comprising:
at a device,
obtaining, for storage at a device, current operating status data for a plurality of consumable physical components, for use in maintaining a preferred operating condition for network infrastructure equipment;
generating historical operating status data for the consumable physical components based on the stored current operating status data; and
generating heuristic maintenance model data for the consumable physical components based on at least one of the current operating status data and the historical operating status data, wherein the heuristic maintenance model data defines maintenance actions and maintenance event trigger criteria for the consumable physical components, and generating the heuristic maintenance model data includes,
identifying relationships between maintenance actions of consumable physical components,
aggregating two or more maintenance actions based on relationships,
defining the maintenance event trigger criteria for the plurality of consumable physical components in order to maintain the preferred operating condition, wherein a respective maintenance event trigger criteria for a particular consumable physical component is based on the aggregation of the maintenance actions,
determining the maintenance event trigger criteria is met for at least one of the plurality of consumable physical components, wherein the maintenance event trigger criteria is an air filter needs to be replaced, and
in response to the maintenance event trigger being met, controlling the at least one consumable physical component to perform one or more remedial actions that are self-addressable by the at least one consumable physical component, wherein the one or more remedial actions include controlling a driver roller to pull filter media across an air intake to change the air filter when the controller determines an air filter change is needed.

16. The method of claim 15 further comprising:
generating maintenance schedule data for the consumable physical components based on the heuristic maintenance model data.

17. The method of claim 15 further comprising:
determining at least one of the maintenance event trigger criteria is met in respect of at least one of the consumable physical components;
in response to determining the at least one maintenance event trigger criteria is met,
generating a maintenance event notification, and
transmitting the maintenance event notification to the at least one notification device; and
transmitting to the at least one of the consumable physical components maintenance action data indicating at least one of the maintenance actions to be performed based on the at least one of the maintenance event trigger criteria being met.

18. The method of claim 15, further comprising:
storing, at the device, the maintenance actions performed in response to the at least one of the maintenance event trigger criteria being met;
determining costs associated with performing the maintenance actions; and
regenerating the heuristic maintenance model data based on the stored performed maintenance actions and the determined costs associated with performing the maintenance actions.

19. The method of claim 15, further comprising:
determining at least one of the maintenance actions is self-addressable by the at least one of the consumable physical components; and
directing the at least one of the consumable physical components to perform the at least one maintenance action.

20. The method of claim 15, wherein the maintenance event trigger criteria are defined based, at least in part, on relative weights between different maintenance action priorities.

* * * * *